United States Patent [19]

Peffley et al.

[11] Patent Number: 4,689,356
[45] Date of Patent: Aug. 25, 1987

[54] POLYURETHANE ELASTOMERS PREPARED IN A TWO-STEP PROCESS USING MIXTURES OF CHAIN EXTENDERS

[75] Inventors: Richard D. Peffley, Lake Jackson; John H. Spells, Clute; James A. Vanderhider, Brazoria, all of Tex.

[73] Assignee: The Dow Chemical Company, Midland, Mich.

[21] Appl. No.: 807,373

[22] Filed: Dec. 10, 1985

[51] Int. Cl.$^4$ .............................................. C08G 18/14
[52] U.S. Cl. ...................................... 521/159; 264/51; 264/328.1; 264/328.6; 264/328.8; 528/61; 528/64
[58] Field of Search .................... 528/61, 64; 521/159; 264/51, 328.1, 328.6, 328.8

[56] References Cited

U.S. PATENT DOCUMENTS 4,327,204 4/1982 Oyaizu et al. .......................... 528/61
4,463,155 7/1984 Kibler .................................. 528/61
4,546,114 10/1985 Alberino et al. ...................... 528/64

Primary Examiner—Maurice J. Welsh

[57] ABSTRACT

This invention is a process for preparing polyurethane and/or polyurea elastomer comprising reacting a liquid, preformed isocyanate-terminated prepolymer, which prepolymer is the reaction product of a stoichiometric excess of a polyisocyanate and a relatively high equivalent weight isocyanate-reactive compound, with a chain extender mixture, which chain extender mixture comprises
(a) a mixture comprising a hydroxyl-terminated chain extender and an aromatic amine terminated chain extender, and/or an aliphatic amine-terminated compound, or
(b) a mixture comprising an aromatic amine-terminated chain extender and an aliphatic amine-terminated compound, wherein the isocyanate index is from about 70 to about 200.

In this process, it is possible to prepare elastomers having excellent properties, particularly excellent flexural and thermal properties, which properties are difficult to obtain in a one-step process.

15 Claims, No Drawings

POLYURETHANE ELASTOMERS PREPARED IN A TWO-STEP PROCESS USING MIXTURES OF CHAIN EXTENDERS

BACKGROUND OF THE INVENTION

This invention relates to the production of polyurethane and/or polyurea elastomers, more particularly to the production of such elastomers in a reaction injection molding process.

Polyurethane elastomers are generally prepared by reacting a polyisocyanate with a relatively high equivalent weight material having active hydrogen atoms, or mixture of such materials having active hydrogen atoms and a relatively low equivalent weight compound or mixture thereof which also contains a plurality of active hydrogens (chain extender). In the commercial production of many such elastomers, the foregoing components are mixed and reacted in a reaction injection molding (RIM) process. In the RIM process, a stream containing the active hydrogen-containing materials and a second stream containing the polyisocyanate are injected under high pressure through a mixing zone and into a mold where curing takes place.

Typically, the complete mixing and filling operation takes place in about 0.5 to about 10 seconds, depending on the particular materials used and the size and configuration of the mold. The reactivity of the materials used must therefore be such that the mold can be filled before the reactants gel. In addition, it is desirable to demold the elastomer as rapidly as possible in order to produce the maximum number of molded parts per mold per period of time. Thus, it is desired that the materials used cure rapidly so the elastomer can be removed from the mold in a short period of time.

In order to remove the elastomer from the mold, it must have enough physical integrity to withstand the stresses encountered during the actual removal process. For example, in demolding an elastomer, it is often necessary to pull, bend, twist or otherwise distort it in order to effect release from the mold. In many cases, the complex geometry of the mold requires that the elastomer be stretched in the demolding process. Accordingly, the elastomer must be able to withstand these actions without tearing. This ability is usually referred to in the art as the "green strength" (or hot tear strength) of the elastomer.

For the forgoing reasons, the materials used in preparing RIM elastomers and the method of preparing the elastomer, must be chosen for their processing characteristics as well as for the properties they impart to the product elastomer.

In preparing elastomers via a RIM process, it is now standard practice to use a "one-shot" process. In the one-step process, the polyisocyanate is reacted simultaneously with the high equivalent weight active hydrogen-containing material and the chain extender. The polyisocyanate is either not prereacted with any of the active hydrogen-containing materials, or is reacted with only a minor portion thereof to form a so-called "quasi-prepolymer". This process is used because it enables the practitioner to balance the weights of the streams which are injected into the mixing head. Because of mechanical limitations in some RIM equipment, it has not been possible to mix streams of significantly different weights. The one-step process also has the advantage of requiring one less process step, since the prepolymer need not be formed.

The major drawback of the one-step process is that it is difficult to prepare high modulus elastomers in this manner. For example, to prepare high modulus polymers for applications such as automobile body panels, it has been found necessary to employ a filler such as milled or flaked glass. As a result, the impact strength and elongation of the elastomer suffer greatly.

In the two-step process, the polyisocyanate is reacted in a first step with all or a major portion of the high equivalent active hydrogen-containing material to form a prepolymer. This prepolymer is then reacted in RIM equipment with the chain extender and any remaining high equivalent weight material to form the elastomer. Unfortunately, it has heretofore been difficult to process these two-step systems. Due to the fast reactivity of the chain extenders, particularly amine-terminated chain extenders such as diethyltoluenediamine (DETDA) it has been particularly difficult to completely mix the components and fill the mold before gelling occurs. In addition, elastomers prepared according to a two-step process have often been extremely brittle at demold.

Due to the disadvantages encountered with the one-step process and the previously known two-step processes, it would be desirable to provide a process for preparing a polyurethane and/or polyurea polymer in which an elastomer having excellent physical properties can be obtained, and in which the difficulties of two-step processes are minimized or overcome.

SUMMARY OF THE INVENTION

This invention is a process for preparing polyurethane and/or polyurea elastomers. The process comprises reacting a preformed liquid isocyanate-terminated prepolymer, which prepolymer is the reaction product of a stoichiometric excess of polyisocyanate and a relatively high equivalent weight isocyanate-reactive compound, with a chain extender mixture, which chain extender mixture comprises (a) a mixture comprising a hydroxyl-terminated chain extender and an aromatic amine terminated chain extender and/or an aliphatic amine-terminated compound, or (b) a mixture comprising an aromatic amine-terminated chain extender and an aliphatic amine-terminated compound, wherein the isocyanate index is from about 70 to about 200.

This process is a prepolymer process for preparing polyurethane and/or polyurea elastomers. In this process, it is possible to prepare elastomers having excellent properties, particularly flexural and thermal properties, which properties are difficult to obtain in a one-step process. Surprisingly, the reactivity of the chain extender mixture with the prepolymer is such that this process is easily carried out, making it possible to mix the reactants and fill the mold before gelling occurs, yet providing an elastomer which has good green strength at demold. With the process, it is possible to prepare very high flexural modulus polymers without using fillers, and to further increase the flexural modulus of filled elastomers.

DETAILED DESCRIPTION OF THE INVENTION

In this invention, a polyurethane and/or polyurea elastomer is prepared by reacting a liquid isocyanate-terminated prepolymer as described herein with a certain chain extender mixture.

The prepolymer employed herein is an isocyanate-terminated reaction product of a reaction mixture comprising a relatively high equivalent weight material containing at least two groups containing active hydrogen atoms (hereinafter "isocyanate reactive material") and at least one polyisocyanate. The prepolymer is a liquid, i.e. has a melting point such that it is a liquid at the temperature at which it is processed to form an elastomer and preferably is a liquid at ambient temperatures (about 5°-30° C.). This prepolymer advantageously has an equivalent weight of about 168 to about 2100, preferably about 200 to about 840, more preferably about 200 to about 525. It will be recognized by the practitioner that the equivalent weight of the prepolymer is a means by which the flexural modulus of the elastomer can be controlled. A lower equivalent weight in the prepolymer requires a greater amount of chain extender per unit weight. Greater amounts of chain extender generally produce a higher flexural modulus elastomer. Thus, it is contemplated to employ a lower equivalent weight prepolymer when preparing a higher modulus elastomer, and a higher equivalent weight prepolymer when preparing a lower modulus elastomer.

The isocyanate-reactive material used to prepare the prepolymer is a compound or mixture of compounds having at least two moities containing hydrogen atoms which are reactive with an isocyanate group, and which advantageously has an equivalent weight (based on the number of such moieties) of at least about 300, preferably at least about 500 and more preferably at least about 700. Suitable such compounds are described, for example, in U.S. Pat. No. 4,394,391, incorporated herein by reference. Preferred compounds are hydroxyl and/or amine-terminated polyethers and polyesters having an average functionality from about 1.8 to about 4, preferably about 1.8 to about 3.0, wherein functionality refers to the number of moieties containing at least one active hydrogen atom. Most preferred are polyether diols and triols of about 700 to 2500 equivalent weight, and the corresponding amine-terminated polyethers.

The most preferred polyethers can be prepared by polymerizing tetrahydrofuran an alkylene oxide, epihalohydrin or like material, in the presence of a polyhydric initiator and an alkaline catalyst, as is described, for example, in U.S. Pat. Nos. 2,902,478, 3,040,076, 3,317,508, 3,341,599 and 3,445,525, all incorporated by reference. These polyethers can be reacted with ammonia or a primary amine and hydrogen to form amine-terminated polyethers as described, for example, in U.S. Pat. No. 3,654,376.

The isocyanate reactive material is reacted with a stoichiometric excess of a polyisocyanate to form the liquid, isocyanate-terminated prepolymer. Suitable polyisocyanates include aliphatic polyisocyanates as well as aromatic polyisocyanates. Such polyisocyanates are described, for example, in U.S. Pat. Nos. 4,065,410, 3,401,180, 3,454,606, 3,152,162, 3,492,330, 3,001,973, 3,594,164 and 3,164,605, all incorporated herein by reference.

Aromatic polyisocyanates particularly useful herein include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate, the so-called "liquid MDI" materials and the like.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

The prepolymer is prepared in any convenient manner by reacting a stoichiometric excess of the polyisocyanate with the isocyanate-reactive material under conditions that an isocyanate-terminated prepolymer is obtained. When more reactive polyisocyanates or isocyanate reactive materials are used, it is possible to simply mix the components at ambient or a slightly elevated temperature to form the prepolymer. When less reactive materials are used, it may be desirable to employ higher temperatures and/or a urethane catalyst as described hereinafter to form the prepolymer.

It is also within the scope of this invention to employ a low equivalent weight active hydrogen-containing compound in the preparation of the prepolymer. Such low equivalent weight compound is used in addition to the relatively high equivalent weight isocyanate reactive material described hereinbefore.

The prepolymer thus formed can be reacted immediately with the chain extender mixture as described herein, or can be recovered and stored for later use. In normal commercial practice, it is contemplated that the prepolymer will be recovered and packaged for later use.

In making an elastomer in accordance with this invention, the prepolymer is reacted with a mixture of chain extenders. This mixture of chain extenders comprises (a) a mixture comprising an hydroxyl-terminated chain extender and an aromatic amine terminated chain extender and/or an aliphatic amine-terminated compound or (b) a mixture comprising an aromatic amine-terminated chain extender and an aliphatic amine-terminated compound. The amounts of prepolymer and chain extender mixture are chosen to provide an isocyanate index (100 times the ratio of isocyanate groups to isocyanate-reactive groups) of about 70-200, preferably about 95-125, more preferably about 100-115.

Hydroxyl-terminated chain extenders useful herein include those compounds having about 2-4, preferably about 2 hydroxyl groups per molecule and an equivalent weight of about 31 to about 300, preferably about 31 to about 150. Exemplary such compounds are ethylene glycol, propylene glycol, diethylene glycol, dipropylene glycol, triethylene glycol, tripropylene glycol, 1,4-butanediol, various bisphenols, trimethylolpropane, hydroquinone, catechol, resorcinol, tetraethylene glycol, glycerine, low molecular weight ethylene and/or propylene oxide derivatives of dihydric initiators, mixtures thereof and the like.

Suitable aromatic amine-terminated chain extenders include those compounds which have about 2-4, preferably about 2 amine groups containing an active hydrogen per molecule. They also advantageously have an equivalent weight (based on the number of such amine groups) of about 54 to about 300, preferably about 54 to about 250, and are preferably soluble or miscible in the other components of the chain extender mixture in the relative amounts present therein.

Exemplary of such chain extenders are phenylene diamine, 2,4-bis(p-aminobenzyl)aniline, 2,4-diaminotolmer with a density of less than about 0.85 g/cc. However, it is within the scope of this invention to employ a blowing agent, particularly in small amounts so as to produce an elastomer having a density of about 0.85, preferably about 0.95, more preferably about 1.0 g/cc or more. Suitable blowing agents include water, low boiling organic compounds, compounds which decompose or react to release a gas during the molding process, and the like. It is also possible to slightly reduce the density of the elastomer by whipping or bubbling air or another inert gas through the prepolymer and/or chain extender mixture prior to their reaction. This process is commonly referred to as "nucleation" and is commonly used to prepare microcellular elastomers having a density from about 0.85–1.1 g/cc.

In preparing an elastomer, the prepolymer is reacted with the chain extender mixture. An isocyanate index of about 90–120 is preferred. In conducting this reaction, the prepolymer and chain extender advantageously are thoroughly mixed and placed into a mold before the mixture gels. Since this reaction takes place rapidly, it is preferred to use high pressure mixing and mold-filling equipment. The high pressure impingement mixing equipment conventionally used in reaction injection molding (RIM) is suitable. However, any apparatus which provides the required rapid mixing and mold filling can be used.

In molding the elastomer, it is common to preheat the prepolymer and the chain extender mixture to a slightly elevated temperature, i.e. about 60°–150° F., preferably about 60°–110° F., prior to mixing. An elevated mold temperature, i.e. about 100°–350° F., preferably about 150°–250° F., is also desirable. The residence time in the mold is selected such that at demold, the elastomer has sufficient mechanical strength to withstand the demolding operation. Preferred residence times in the mold, in order to obtain the greatest economic advantage, are from about 10 to about 300, more preferably about 10 to about 120, most preferably about 15–45 seconds.

Following demolding of the elastomer, it may be desirable to postcure the part in order to further improve its properties. Typical postcuring conditions include a temperature of about 100°–400° F. for about 5 minutes to about 2 hours.

The elastomer of this invention is useful, for example, in preparing automobile fascia, body panels, beer keg skirts, and like uses. Preferred elastomers prepared according to this invention exhibit an unfilled flexural modulus (at a density of about 1.15 g/cc) of at least about 25,000 psi, preferably at least about 75,000 psi, more preferably at least about 150,000 psi, and most preferably about 180,000 psi.

The following examples are provided to illustrate the invention but are not intended to limit the scope thereof. All parts and percentages are by weight unless otherwise indicated.

EXAMPLE I

Elastomer Sample Nos. 1–2 are prepared from the following formulation:

| | |
|---|---|
| 1,4-butanediol | 60 parts by weight |
| 400-MW amine-terminated polyether | 7 parts by weight |
| tin catalyst | 0.12% by weight of chain extenders |
| Prepolymer A | to provide index indicated below |

Prepolymer A is prepared by reacting diphenylmethanediisocyanate (MDI) with a 6000 molecular weight poly(propylene oxide) triol to form a prepolymer containing about 12% by weight —NCO groups, and then diluting this prepolymer with additional MDI to obtain a prepolymer solution containing about 20.5% —NCO groups (205 equivalent weight).

The butanediol, amine-terminated polyether and catalyst are thoroughly blended. This mixture is then heated to about 100° F. Prepolymer A is separately heated to about 143° F. Using a Krauss-Maffei PU-80 RIM machine, the chain extender mixture and prepolymer are reacted at a 100 index to form a ⅜" thick plaque. The mold is preheated to 160° F. prior to injecting the reactants. The residence time in the mold is five minutes. After demolding the part, it is post cured at 325° F. for 30 minutes. This elastomer is designated as Sample No. 1.

Elastomer Sample No. 2 is prepared in like manner, except the isocyanate index is 105.

Comparative Sample Nos. A and B are prepared in similar manner as Sample Nos. 1 and 2, respectively, except none of the amine terminated polyether is used.

The resulting Samples and Comparative Samples are tested for tensile strength, flexural modulus, tear strength, hardness and heat sag, with results as reported in Table I following.

TABLE I

| Sample or Comparative Sample No. | 1 | A | 2 | B |
|---|---|---|---|---|
| A/B ratio[1] | 4.27 | 4.55 | 4.78 | 4.48 |
| Index | 100 | 100 | 105 | 105 |
| Flexural Modulus, psi[2] | 159,500 | 141,400 | 163,400 | 154,500 |
| Tensile Strength[3], psi | 4,800 | 5,000 | 4,200 | 4,800 |
| Elongation[3] % | 310 | 280 | 250 | 310 |
| Tear Strength[4], pli | 1,072 | 1,146 | 1,145 | 1,130 |
| Heat Sag[5], in. | 0.2 | 1.1 | 0.9 | 0.7 |
| Shore D Hardness[6] | 65 | 64 | 64 | 64 |
| Specific Gravity, g/cc | 1.20 | 1.20 | 1.16 | 1.20 |

[1]Weight ratio of prepolymer (A-side) to chain extender mixture (B-side).
[2]ASTM D-790
[3]ASTM D-412
[4]ASTM D-470C
[5]Determined at 325° F. for 30 minutes with a 6" overhang
[6]ASTM D-2240

As can be seen from the data in Table I, a significant increase in flexural modulus is obtained with the practice of this invention. In addition, the Comparative Samples show gel lines, indicating that the system processes poorly.

EXAMPLE II

Elastomer Sample Nos. 3–6 are prepared from the following formulation:

| | |
|---|---|
| ethylene glycol | 44 parts by weight |
| 400-MW amine-terminated polyether | 7 parts by weight |
| tin catalyst | 0.05% by weight of chain extenders |
| Prepolymer A | to provide index indicated below |

The chain extenders and catalyst are blended as described in Example 1, and heated to about 100° F. Preuene, 2,6-diaminotoluene, 2,4'-diphenylmethanediamine, 2,6'-diphenylmethanediamine, naphthalene-1,5-diamine, triphenylmethane-4,4',4"triamine, 4,4'-di-(methylamino)-diphenylmethane, 1-methyl-2-methylamine-4-aminobenzene, polyphenylpolymethylene polyamines, 1,3-diethyl-2,4-diaminobenzene, 1-methyl-3,5-diethyl-2,4-diaminobenzene, 1-methyl-3,5-diethyl-2,6-diaminobenzene, 1,3,5-triethyl-2,6-diaminobenzene, mixtures thereof and the like. The isomers of methyldiethyldiaminobenzene are referred to in the art as DETDA. In general, stearically hindered aromatic diamines such as are described in U.S. Pat. No. 4,218,543 to Weber (incorporated herein by reference) are useful. Chemically blocked aromatic amines such as the sodium chloride complex of diphenylmethanediamine are also useful.

Suitable aliphatic amine compounds have about 2-4, preferably about 2 aliphatic amine groups which contain an active hydrogen per molecule. Such compounds also advantageously have an equivalent weight (based on number of such amine groups) of about 32 to about 300, preferably about 32-250, except that when the aliphatic amine compound is an amine-terminated polyether, the equivalent weight can be as high as about 2000.

Exemplary of such compounds are ethylenediamine, 1,3-diaminopropane, 1,4-diaminobutane, diethylenetriamine, aminoethylethanolamine, diaminocyclohexane, hexamethylenediamine, methyliminobispropylamine, iminobispropylamine, bis(aminopropyl)piperazine, aminoethylpiperazine, 1,2-diaminocyclohexane, bis-(p-aminocyclohexyl)methane, triethylenetetraamine, and amine-terminated polyethers having about 2-3 terminal amine groups and an equivalent weight of about 100 to about 2000, preferably about 150 to about 1000, more preferably about 150-300.

The preferred aliphatic amine compounds are the amine-terminated polyethers. The preferred aromatic amine chain extenders are the stearically and/or chemically hindered aromatic diamines.

When a mixture of a hydroxyl-terminated chain extender and an aromatic amine-terminated chain extender is used, the hydroxyl-terminated chain extender advantageously comprises about 15-85, preferably 20-80, more preferably about 25-75 percent of the combined weight of the hydroxyl- and aromatic amine-terminated chain extenders.

When an aliphatic amine-terminated compound is employed in an admixture with either a hydroxyl-terminated chain extender or an aliphatic amine-terminated compound, it is advantageous to use about 0.01 to about 0.5, preferably about 0.01 to about 0.25, more preferably about 0.02 to about 0.1 equivalent of the aliphatic amine-terminated compound per equivalent of the aromatic amine-terminated chain extender or hydroxyl-terminated chain extender. In a most preferred embodiment, the aliphatic amine-terminated compound also comprises about 15-80 percent of the weight of the chain extender mixture.

Preferred chain extender mixtures include mixtures of ethylene glycol and an isomeric mixture of DETDA, diethylene glycol and DETDA, triethyleneglycol and DETDA, propylene glycol and DETDA, 1,4-butanediol and DETDA, a 100-2000 equivalent weight di- or trifunctional amine-terminated polyether and DETDA, mixtures of ethylene glycol, DETDA and a 100-2000 equivalent weight di- or trifunctional amine-terminated polyether and the corresponding mixtures in which DETDA is replaced with another aromatic diamine which is stearically or chemically hindered to reduce the reactivity of the amine groups relative to the amine groups in phenylene diamine.

In addition to the critical components described before, the chain extender mixture may also contain minor amounts of a relatively high equivalent weight active hydrogen containing compound. In certain embodiments of the invention an amine-terminated polyether is used which itself is a relatively high equivalent weight material. In such cases, the number of equivalents of the high equivalent weight compound(s) used in the chain extender mixture should not exceed about 50%, preferably about 36%, more preferably about 20%, and most preferably about 10% of the number of equivalents of relatively high equivalent weight active hydrogen containing compound used in preparing the prepolymer.

In addition to the prepolymer and chain extender mixture, other optional components may be employed in preparing the elastomer. These materials are conventionally combined with the chain extender mixture before molding the elastomer, but may be added to the mold in separate streams or be mixed with the prepolymer.

A catalyst for the reaction of the chain extender mixture and the prepolymer is advantageously employed. Catalysts for such reactions are well-known and described, for example, in U.S. Pat. No. 4,495,081, incorporated herein be reference. Preferred catalysts include tertiary amine compounds and organometallic compounds. Generally, from about 0.01 to about 1 part of catalyst is used per 100 parts of isocyanate-reactive materials in the reaction mixture, although the precise amount used is a matter of choice to the skilled artisan.

Preferred tertiary amine catalysts include, for example, triethylenediamine, triethylamine, tetramethylbutanediamine, N,N-dimethylethanolamine, N-ethylmorpholine, N-methylmorpholine. Preferred organometallic catalysts include organometallic compounds of tin, zinc, lead, mercury, cadmium, bismuth, antimony, iron, manganese, cobalt, copper, vanadium and the like, particularly organotin compounds such as dimethyltindilaurate and dibutyltindilaurate.

In addition, pigments, coloring agents, mold release agents, fire retardant agents, fillers, reaction modifiers, antioxidants, preservatives and the like may be employed in the preparation of the elastomer.

Although it is possible to employ a filler material in order to increase the flexural modulus of the elastomer, an advantage of this invention is that it permits the preparation of very high flexural modulus elastomers without the use of such fillers. Thus, it may be found that the use of such fillers is not required, or that lesser amounts thereof are needed, in order to obtain a desired modulus.

It is generally preferred to employ an internal mold release agent in order to facilitate the removal of the elastomer from the mold. Suitable mold release agents are described, for example, in U.S. Pat. Nos. 3,726,952 and 4,111,861. The preferred mold release agent comprises a mixture of an amine-containing material and a metallic salt of a carboxylic acid, as described in copending application Ser. No. 570,141, filed Jan. 12, 1984.

It is generally preferred to prepare a noncellular or microcellular elastomer. Accordingly, the use of blowing agents is generally not preferred, when the use thereof is in an amount sufficient to produce an elasto- The prepolymer is reacted with the active hydrogen-containing composition at a 100 index using a Krauss-Maffei PU 80 RIM machine. The weight ratio of prepolymer to B-side is 1.427. Before molding, the prepolymer is heated to 110° F. and the B-side is heated to 100° F. The mold, a flat ⅛" plaque mold, is preheated to about 275°–295° F. After 5 minutes in the mold, the part is removed and tested, with results as indicated in Table V following (Sample No. 12). Sample No. 13 is similarily made, except it is post cured as indicated in Table V.

The experiment is again repeated, (Sample No. 14) this time using a weight ratio of about 1.5 to provide an isocyanate index of 105. A fourth experiment is run (Sample No. 15) which is identical to Sample No. 14 except it is postcured as indicated in Table V.

The experiment is again repeated, this time adding about 75 parts milled glass and about 1.5%, based on isocyanate-reactive components, of a silicone surfactant to the formulation used to prepare Sample No. 12. The weight ratio of prepolymer to B-side is adjusted to 1.02 to provide a 105 index, and the mold temperature is increased to about 305°–315° F. This sample is designated Sample No. 16.

Each of the moldings is tested for physical properties, with the results as indicated in Table V following.

TABLE V

| Sample No. | 12 | 13 | 14 | 15 | 16 |
|---|---|---|---|---|---|
| Index | 100 | 100 | 105 | 105 | 105 |
| Postcure Conditions[1] | None | 325°/30 min | None | 325°/60 min | 325°/30 min. |
| % Glass | 0 | 0 | 0 | 0 | 16 |
| Specific Gravity, g/cc | 1.07 | 1.04 | 0.93 | 1.08 | 1.14 |
| Tensile Strength[2], psi | 2,600 | 2,500 | 2,100 | 4,025 | 2,500 |
| Elongation[2], % | 219 | 203 | 132 | 239 | 107 |
| Flexural Modulus[3] psi | 53,600 | 47,200 | 39,400 | 58,800 | 92,300 |
| Gardner Impact[4], (R.T. in-lb) | 264 | 216 | 312 | 203 | 150 |
| −20° C. Gardner Impact[4], in-lb | 27 | 168 | >225 | 193 | 5 |
| Shore D Hardness[5] | 58 | 58 | 53 | 61 | 61 |
| Heat Sag[6], in. | 0.25 | 0.15 | 0.10 | 0.04 | 0.13 |
| Tear Resistance[7] (p.l.i.) | 506 | 499 | 459 | 627 | 465 |

[1]Time in minutes and temp. in °F.
[2]ASTM D-412
[3]ASTM D-790
[4]ASTM D-3029 R.T. = room temperature
[5]ASTM D-2240
[6]Determined at 315° F. for 30 minutes with a 6" overhang
[7]ASTM D-624

These elastomers have excellent properties, based on their hardness and densitites. Particularly good low temperature impact values are seen, even when no postcuring is done.

We claim:

1. A two-step process for preparing a polyurethane and/or polyurea elastomer comprising reacting, in a reaction injection molding process, a preformed, liquid, isocyanate-terminated prepolymer, which prepolymer is the reaction product of a stoichiometric excess of a polyisocyanate and a relatively high equivalent weight isocyanate-reactive compound, with a chain extender mixture, which chain extender mixture comprises
   (a) a mixture comprising a hydroxyl-terminated chain extender having an equivalent weight of about 31 to about 150 and an aromatic amine terminated chain extender and/or an aliphatic amine-terminated compound, or
   (b) a mixture comprising an aromatic amine-terminated chain extender and an aliphatic amine-terminated compound, wherein the isocyanate index is from about 70 to about 200,
wherein said chain extender mixture contains fewer than about 0.5 equivalent of a relatively high equivalent weight isocyanate-reactive compound per equivalent of relatively high equivalent weight isocyanate reactive compound used in preparing said prepolymer.

2. The process of claim 1 wherein said prepolymer has an equivalent weight from about 200 to 525.

3. The process of claim 2 wherein said chain extender mixture comprises a mixture of a hydroxyl-terminated chain extender and a stearically hindered aromatic diamine.

4. The process of claim 3 wherein said hydroxyl-terminated chain extender comprises about 25–75 percent of the combined weight of the hydroxyl terminated chain extender and the amine-terminated chain extender.

5. The process of claim 4 wherein said chain extender mixture comprises a mixture of ethylene glycol, propylene glycol or 1,4-butane diol and diethyltoluenediamine.

6. The process of claim 2 wherein said chain extender mixture comprises a mixture of an amine-terminated polyether having about 2–3 amine groups per molecule and an equivalent weight of about 100 to 2000, and a stearically hindered aromatic diamine.

7. The process of claim 5 wherein said chain extender mixture contains about 0.01 to about 0.5 equivalent of the amine-terminated polyether per equivalent of aromatic diamine.

8. The process of claim 7 wherein said stearically hindered aromatic diamine is diethyltoluenediamine and the amine-terminated polyether has an equivalent weight of about 150–300.

9. The process of claim 2 wherein said chain extender mixture comprises a mixture of an amine-terminated polyether having about 2–3 amine groups per molecule and an equivalent weight of about 100 to about 2000, and a hydroxyl-terminated chain extender.

10. The process of claim 9 wherein said chain extender mixture contains about 0.01 to about 0.5 equivalent of amine-terminated polyether per equivalent of aromatic diamine.

11. The process of claim 4, 7, or 10 wherein said prepolymer is the reaction product of a reaction mixture comprising an aromatic diisocyanate and a polyether polyol having an equivalent weight from about 700 to about 2500.

12. The process of claim 4, 7, or 10 wherein said prepolymer is the reaction product of a reaction mixture comprising an aromatic diisocyanate and an amine-terpolymer A is separately heated to about 160° F. The components are processed on a Krauss-Maffei PU-80 RIM machine at a 100 index, using a ⅛" flat plaque tool which is preheated to 165° F. The part is demolded after 2 minutes in the mold, and tested as described in Example 1. This elastomer is designated Sample No. 3. Sample Nos. 4, 5 and 6 are prepared and tested in like manner, at a 105, 110, and 115 index, respectively.

Comparative Sample Nos. C-F are prepared and tested as described with respect to Sample Nos. 3-6, respectively, except none of the amine-terminated polyether is used.

The results obtained by testing Sample Nos. 3-6 and Comparative Sample Nos. C-F are as reported in Table II.

TABLE II

| Sample or Comparative Sample | 3 | C | 4 | D | 5 | E | 6 | F |
|---|---|---|---|---|---|---|---|---|
| A/B ratio[1] | 5.84 | 6.48 | 6.12 | 6.8 | 6.42 | 7.12 | 6.71 | 7.45 |
| Index | 100 | 100 | 105 | 105 | 110 | 110 | 115 | 115 |
| Flexural Modulus, psi[2] | 99,300 | 86,800 | 95,600 | 93,600 | 110,600 | 100,200 | 115,000 | 98,500 |
| Tensile Strength[3] | 5,000 | 3,900 | 5,000 | 5,000 | 4,900 | 5,100 | 4,800 | 5,400 |
| Elongation[3] | 130 | 100 | 118 | 125 | 138 | 128 | 138 | 136 |
| Tear Strength[4] | 772 | 728 | 791 | 828 | 824 | 832 | 800 | 849 |
| Heat Sag[5] | 0.6 | 0.65 | 0.65 | 0.6 | 0.25 | 0.7 | 0.2 | 0.45 |
| Shore D Hardness[6] | 63 | 62 | 64 | 62 | 65 | 63 | 66 | 62 |
| Specific Gravity | 1.18 | 1.21 | 1.17 | 1.21 | 1.17 | 1.22 | 1.18 | 1.22 |

[1]Weight ratio of prepolymer (A-side) to chain extender mixture (B-side).
[2]ASTM D-790
[3]ASTM D-412
[4]ASTM D-470C
[5]Determined at 325° F. for 30 minutes with a 6" overhang
[6]ASTM D-2240

As can be seen from this data, the samples prepared in accordance with this invention all exhibit increases in flexural modulus compared with the Comprative Samples. These increases are substantial in three of four cases, despite the fact that the density of each Sample is lower than the corresponding Comparative Sample. Other properties are roughly comparable, except that a substantial increase in elongation is seen when comparing Sample 3 with Comparative Sample C, and Sample Nos. 5 and 6 have much better heat sag values than their respective Comparative Samples.

EXAMPLE III

Elastomer Sample Nos. 7-11 are prepared according to the general process described in Example 1, using a Cincinnati-Millicron HT RIM machine and a formulation as indicated in Table III following. In each instance, the chain extender mixture is preheated to about 80° F. and the prepolymer to 100° F. The mold temperature is about 165° F. Demold time is 45 seconds. The part is postcured for 15 minutes at 300° F. before physical properties are measured.

TABLE III

| | Sample No. | | | | |
|---|---|---|---|---|---|
| Component | 7 | 8 | 9 | 10 | 11 |
| A-side | | | | | |
| Prepolymer B[1] (index) | 105 | | | | |
| Prepolymer C[2] (index) | | 103 | 103 | 110 | |
| Prepolymer D[3] (index) | | | | | 95 |
| B-side | Parts by weight | | | | |
| 1,4-BDO[4] | 85 | 85 | 75 | 50 | 50 |
| DETDA[5] | — | — | 25 | 50 | 50 |
| D-400[6] | 15 | 15 | — | — | — |
| Tin Catalyst | 0.1 | 0.1 | 0.1 | 0.1 | 0.1 |

TABLE III-continued

| | Sample No. | | | | |
|---|---|---|---|---|---|
| Component | 7 | 8 | 9 | 10 | 11 |
| A/B ratio | 3.83 | 4.52 | 4.31 | 3.95 | 3.58 |

[1]Prepared by reacting equal quantities of a 143 equivalent weight "liquid MDI" and a 5000 molecular weight poly(propylene oxide) triol, and diluting to 198 equivalent weight with additional liquid MDI.
[2]Prepared by reacting 47.9 parts MDI, 11.4 parts liquid MDI, 27.4 parts of a 1600 equivalent weight ethylene oxide-capped poly(propylene oxide) triol and 5.3 parts triethylene glycol, and diluting to 215 equivalent weight with MDI.
[3]Prepared by reacting MDI with a 4000 molecular weight amine-terminated poly(propylene oxide) diol to obtain a 226 equivalent weight prepolymer.
[4]1,4-butanediol
[5]Diethyltoluenediamine, mixture of 2,4 and 2,6 isomers.
[6]A 400 molecular weight difunctional amine-terminated poly(propylene oxide).
[7]The ratio of the weight of the A-side to that of the B-side.

The properties of the samples are as reported in Table IV following.

TABLE IV

| Sample No. | 7 | 8 | 9 | 10 | 11 |
|---|---|---|---|---|---|
| Specific Gravity, g/cc | 1.14 | 1.08 | 1.14 | 1.20 | 1.16 |
| Flexural Modulus[1] psi | 186,000 | 168,000 | 202,000 | 244,000 | 171,000 |
| Tensile Strength[2], psi | 5,800 | 5,100 | 6,100 | 8,500 | 6,200 |
| Elongation[2], % | 120 | 162 | 67 | 62 | 103 |
| Heat Sag[3], in. | 1.2 | 0.7 | 1.3 | 0.6 | 0.7 |
| Notched Izod[4], in-lb | 57 | 19 | 48 | 31 | 71 |
| CLTE[5] | N.D. | 65 | 64 | N.D. | N.D. |

[1]ASTM D-790
[2]ASTM D-412
[3]Determined at 325° F. for 30 minutes with a 6" overhang
[4]ASTM D-256
[5]Coefficient of Linear Thermal Expansion ASTM D-696

As can be seen from this data, very high modulus polymers can be prepared according to this invention. In addition, these elastomers have surprisingly high tensile strengths and excellent elongation for such stiff polymers.

EXAMPLE IV

An isocyanate-terminated prepolymer is prepared by reacting approximately equal weights of a 2000 molecular weight poly(propylene oxide) diol with hexamethylenediisocyanate at 50° C. The resulting prepolymer is a liquid containing about 22.5% free isocyanate groups and has an equivalent weight of about 184.2.

An active hydrogen-containing composition (B-side) is prepared by thoroughly mixing 100 parts of DETDA, 30 parts of a 5000 molecular weight, trifunctional, amine-terminated poly(propylene oxide) (T-5000, available from Texaco Chemical Company), and 20 parts of a 2000 molecular weight, difunctional, amine-terminated poly(propylene oxide) (D-2000, available from Texaco Chemical Company).

minated polyether having an equivalent weight from about 700 to about 2500.

13. The process of claim 4, 7, or 10 wherein said prepolymer is prepared from an aliphatic diisocyanate.

14. The process of claim 2 wherein the isocyanate index is from about 100 to about 115.

15. The process of claim 14 wherein the elastomer has an unfilled flexural modulus of at least about 150,000 psi at a density of about 1.15 g/cc.

* * * * *